(12) United States Patent
Vackar

(10) Patent No.: US 6,599,658 B2
(45) Date of Patent: Jul. 29, 2003

(54) BATTERY CASE

(75) Inventor: Mark A Vackar, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 0 days.

(21) Appl. No.: 09/794,118

(22) Filed: Feb. 28, 2001

(65) Prior Publication Data

US 2001/0012579 A1 Aug. 9, 2001

Related U.S. Application Data

(62) Division of application No. 09/140,548, filed on Aug. 26, 1998, now Pat. No. 6,197,444.

(51) Int. Cl.$^7$ ................................................ H01M 2/10
(52) U.S. Cl. ..................... 429/99; 429/100; 429/159; 429/186
(58) Field of Search ..................... 429/99, 100, 186, 429/159, 158, 156

(56) References Cited

U.S. PATENT DOCUMENTS 1,564,173 A * 12/1925 Ford et al.
3,264,140 A * 8/1966 Gohle
4,593,461 A    6/1986 Thiele et al.
5,318,864 A * 6/1994 Shannon et al. ............ 429/160
5,536,595 A    7/1996 Inkmann et al.
5,681,668 A   10/1997 Reed et al.
6,190,795 B1 * 2/2001 Daley ......................... 429/100

* cited by examiner

Primary Examiner—John S. Maples
(74) Attorney, Agent, or Firm—Banner & Witcoff, Ltd.

(57) ABSTRACT

A battery case comprising a pair of case members joined together along a seam to form a housing. Each case member includes a pair of sidewalls adapted to define a base surface on which the case rests so as to permit a plurality of resting orientations of the battery case. The seam is positioned above the lowermost base surface of the casing to contain any leaked battery acid regardless of case orientation. Further, the battery case includes supports for supporting the lower surface of the battery above any leaked acid, as well as partitions that define a discrete cavity for each battery to isolate the battery from an adjacent battery that may be leaking. The battery case also includes an electrical connector mounted for two dimensional movement that facilitates completion of a blind and automatic connection of the battery case with a complementary connector.

22 Claims, 4 Drawing Sheets

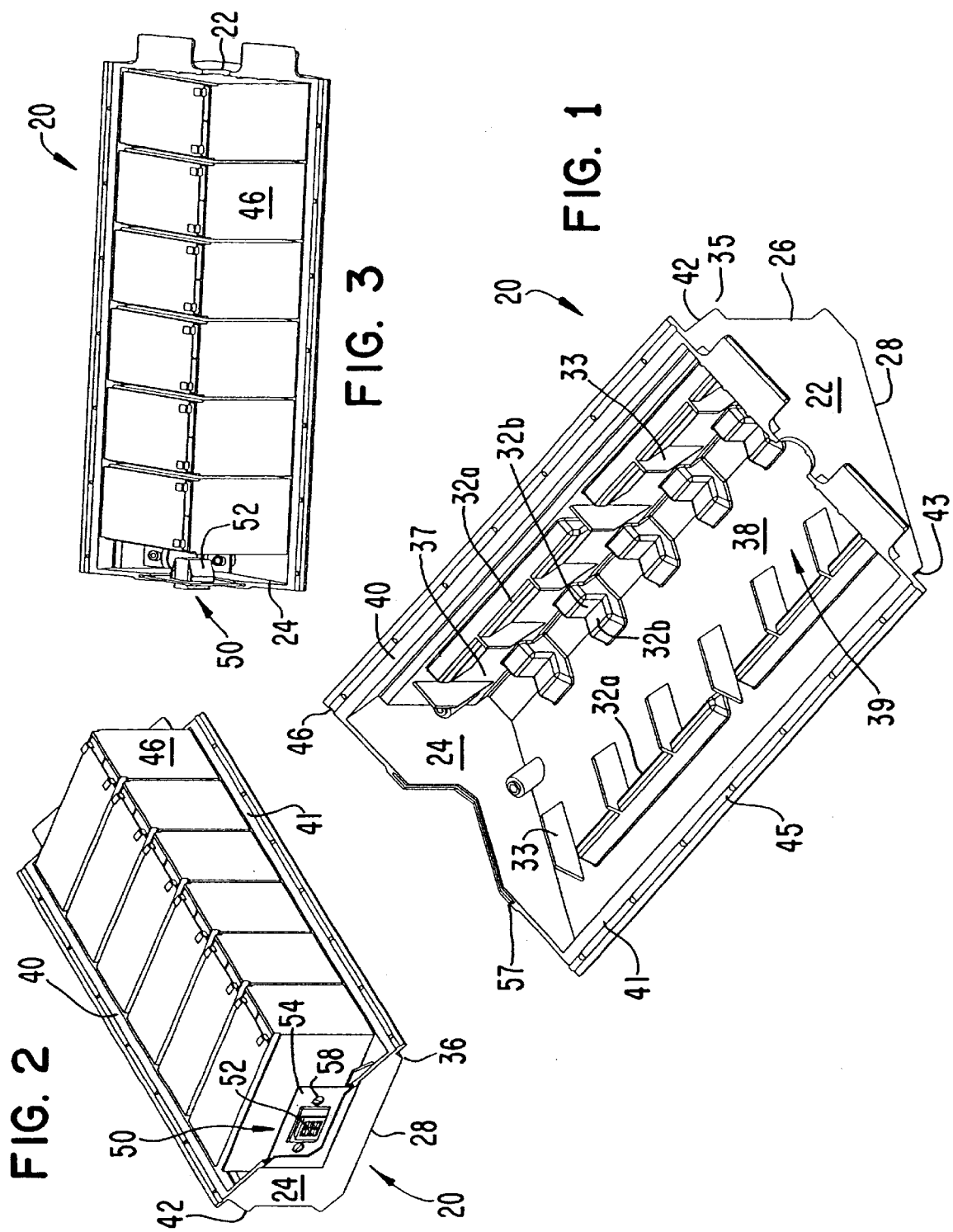

BATTERY CASE

This is a divisional application of U.S. patent application Ser. No. 09/140,548, filed Aug. 26, 1998 now U.S. Pat. No. 6,197,444.

FIELD OF THE INVENTION

This invention relates to battery cases, and in particular to cases for use in an uninterruptible power supply.

BACKGROUND OF THE INVENTION

Uninterruptible power supplies (UPS) serve as back-up power supplies to critical electrical devices during outages of regular power supplies. The UPS is generally computer controlled and monitors the power supplied to the electrical device, switching on the back-up power supply if the normal power supply becomes insufficient. Therefore it is crucial that the UPS be reliable even after periods of minimal maintenance. A UPS typically draws its backup power from a set of lead-acid batteries connected in series and housed in a battery case. The battery cases are housed in a UPS cart with a front door that opens and allows the battery case to be slid into the cart and connected.

Current battery cases consist of a top piece and a bottom piece constructed of a non-conducting material, usually a heavy plastic. The bottom piece is divided into compartments by short fins, each compartment containing two or more batteries which have been adhered together. The batteries are wired in series and connected to an electrical connector mounted in an end panel of the bottom piece. The top piece is then secured to the bottom piece to form a generally rectangular container whose seam runs along the center of the container.

Battery cases provide for improved safety and handling of lead-acid batteries. As can be appreciated, lead-acid batteries pose hazards due to the possible leakage of acid contained within the battery. For example, acid leaked from a battery can cause short circuits and result in damage to equipment and an increased risk of fires. While conventional battery cases are able to contain leaked acid within the case when the case is positioned correctly on its bottom piece, the battery case during installation may be dropped or set down on a side having a seam through which the acid may leak. Conventional cases also do not effectively protect other batteries within the case from the leaked acid. The presence of the seam also limits the case to a single orientation within the UPS. Accordingly a different battery case has generally been required for each different style of UPS.

Further, the UPS electrical connections are located at the back of elongated narrow bays defined in the UPS cart for receiving the battery cases. The connection therefore has usually been made by hand with minimal space and poor lighting. Such a hand connection requires that the UPS be powered down to prevent injuries, thus defeating the purpose of a continuous backup power supply.

In an effort to eliminate manual coupling of the connectors, the connectors have been mounted on stiff springs for limited movement. The springs function to press the connector forward and thereby allow the connector members a limited amount of back and forth shifting in an effort to achieve coupling of the connectors when the battery cases are inserted. However, this type of adjustment has proven to be largely ineffective. To better align the connectors, the battery cases have been formed with guide members on their bottom surfaces for mating receipt in guiding grooves formed in the bays of the UPS shelves. However, connection is still difficult because of the stiffness of the springs and the weight of the cases, which can sometimes be over 100 pounds.

SUMMARY OF THE INVENTION

Accordingly, it is an object of the present invention to provide a battery case that contains acid leaks from lead acid batteries so as to eliminate short-circuits of the batteries and other acid related injuries to the user or equipment.

Another object of the present invention is to contain leaks of the battery regardless of the orientation of the battery case on different sidewalls to allow for a range of installation configurations and worry-free handling.

Another object of the present invention is to reduce the risk of electrical shocks during installation of the battery case by facilitating a blind electrical connection that obviates the need for handling the actual connectors in a difficult to reach place with poor lighting conditions.

A still further object of the invention is to achieve an easy automatic coupling of the connector when the battery case is inserted into a bay of a UPS.

In one aspect of the invention, a battery case comprises a pair of case members joined together to form a housing. Each case member includes a pair of sidewalls that serve not only to contain the batteries, but are also adapted to support the case. Each case member further includes a pair of transverse end walls interconnecting the sidewalls to form an enclosure about the batteries. The case members are joined along a seam which is above the sidewall forming the lowermost base wall for the casing so as to contain acid leaks within the casing.

In another aspect of the invention, the battery case comprises supports for supporting the battery above the interior surface of the lowermost base wall of the battery case, and partitions that define a discrete cavity for each battery. The supports and partitions guard against acid leaked from one battery contacting and affecting another adjacent battery.

In accordance with another aspect of the invention, each battery case includes a connector electrically connected to the batteries enclosed therein and a mount for attaching the connector that allows at least two-dimensional movement of the connector relative to the housing. The mount and connector further include a guide structure that cooperates with a guide structure of a complementary connector to facilitate electrical coupling of the connectors. The ability of the mount to have a two-dimensional freedom of movement and the use of guide structures enables an easy blind and automatic connection of the two connectors.

The above and other objects, features and advantages of the present invention will be readily apparent and fully understood from the following detailed description of preferred embodiments, taken in connection with the appended drawings.

BRIEF DESCRIPTION OF THE DRAWINGS

FIG. 1 is a perspective view of one-half of a symmetrical two-piece battery case in accordance with the present invention.

FIG. 2 is a perspective view of the one-half of a battery case shown in FIG. 1 with an electrical connector plate and lead-acid batteries installed.

FIG. 3 is a side perspective view of the case shown in FIG. 2.

DETAILED DESCRIPTION OF THE PREFERRED EMBODIMENTS

Figure 4:
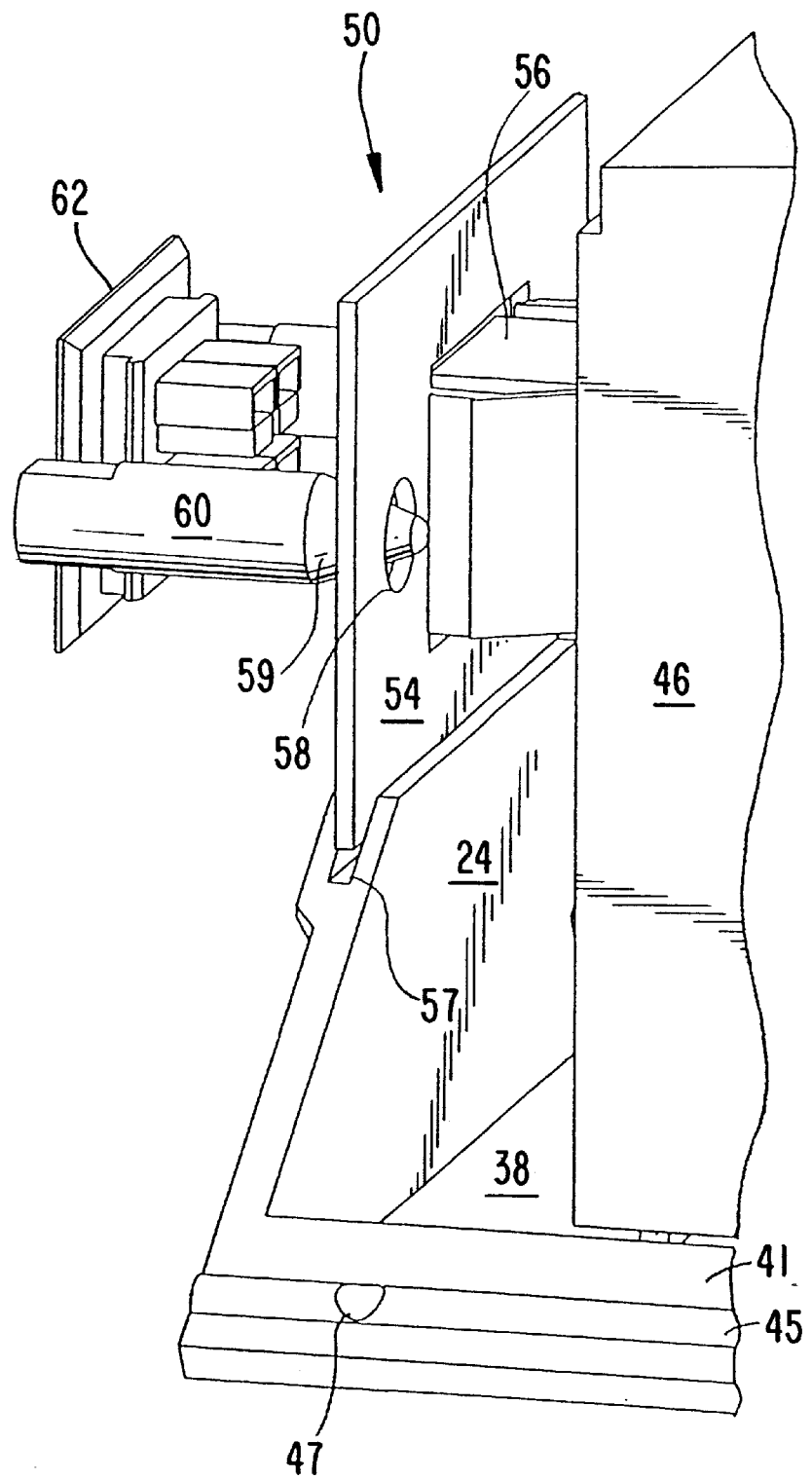
FIG. 4 is an enlarged fragmentary perspective view of one end of the case (with one-half omitted) with the connector plate receiving guides during installation in a UPS.
Figure 5:
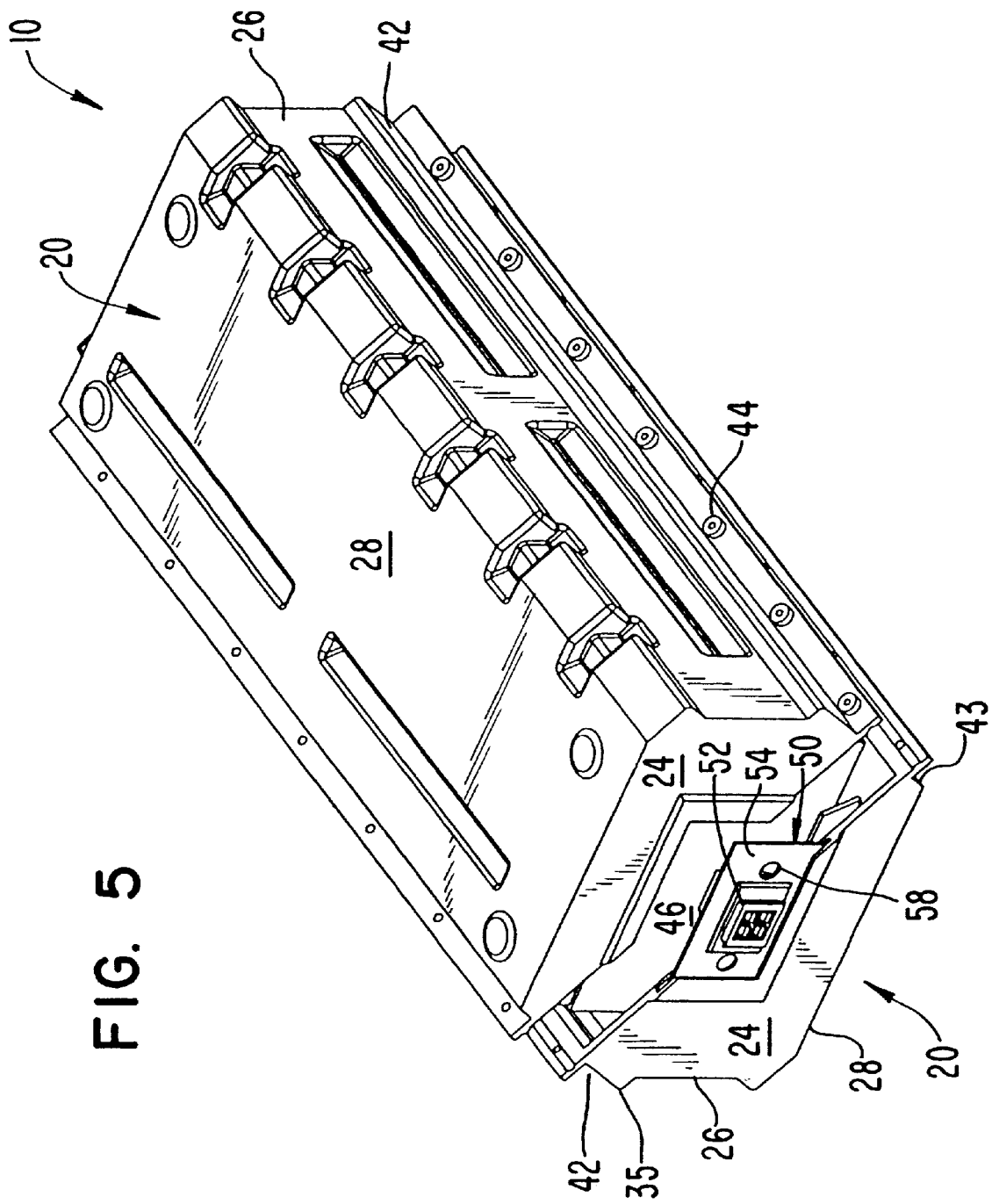
FIG. 5 is a perspective view of the battery case with second-half of the battery case being closed over the batteries mounted in the first half.
Figure 6:
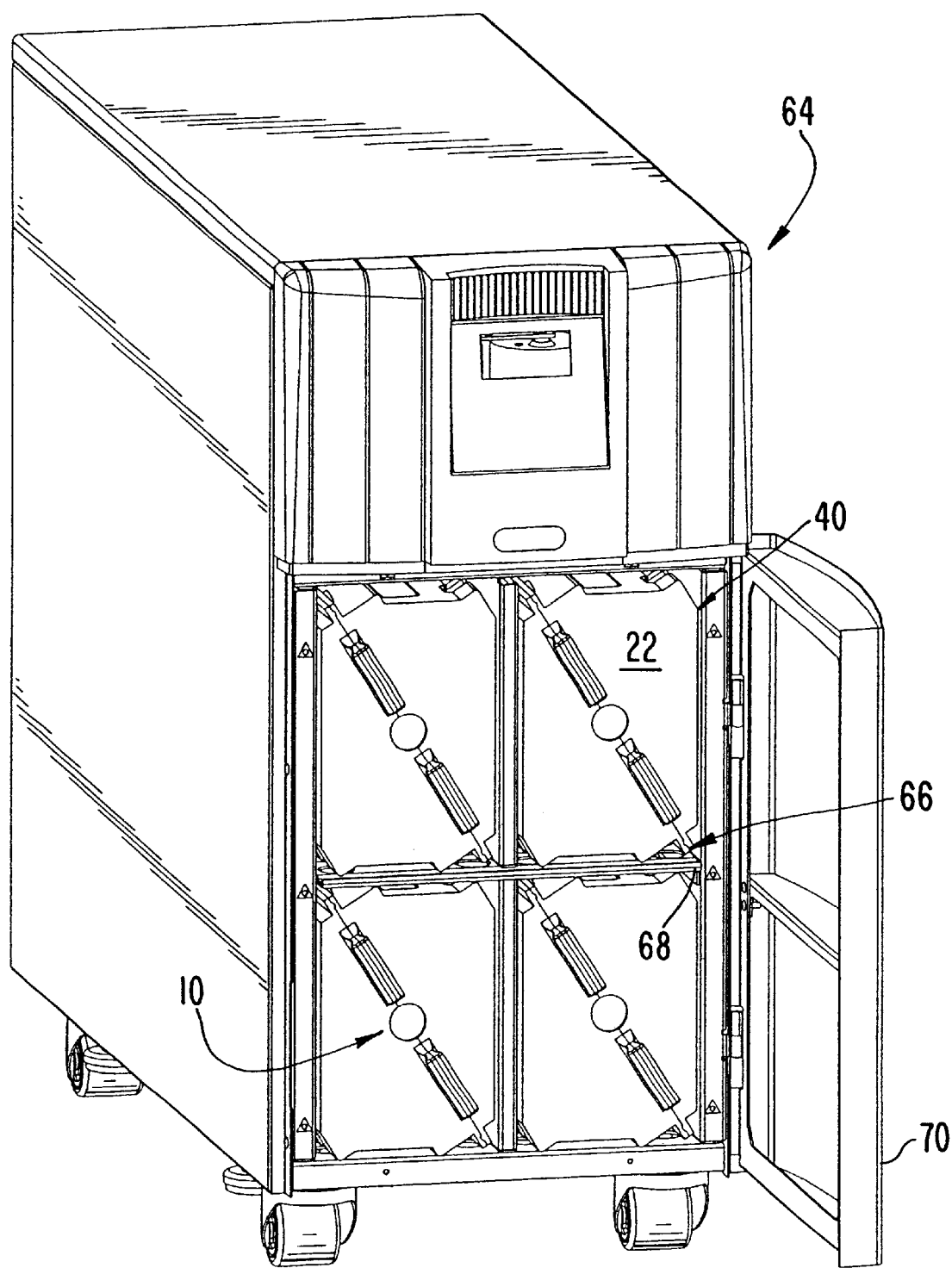
FIG. 6 is a perspective view of an uninterruptible power supply cart with the front door of the cart open, revealing four installed battery cases.

A battery case 10 in accordance with the present invention contains a plurality of electrically connected batteries to ease handling, contain leaks and facilitate enhanced connection during use. In a preferred embodiment, battery case 10 includes case members 20 that are interconnected to enclose and contain the batteries. Case members 20 are preferably identical for greater efficiency in manufacturing and greater ease of assembly; although differences could be incorporated in the case members if desired.

Each case member 20 includes a pair of sidewalls 26, 28 interconnected along one edge to define a generally v-shaped groove configuration. The sidewalls are joined at an angle of 90 degrees so as to form a generally rectangular container when the case members 20 are coupled together. Sidewall 28 is typically longer to accommodate the lengths of the batteries which are usually greater than their heights. Of course, the dimensions of the case members could vary depending on the size, shape and orientation of the batteries within the case. A pair of end walls 22, 24 interconnect sidewalls 26, 28 to form one-half of the enclosure. Sidewalls 26, 28 and end walls 22, 24 collectively define a case opening into which batteries 46 are placed during assembly.

The interior of each sidewall 26, 28 is provided with supports 32 and partitions 33. In the preferred construction, a first set of supports 32a, in the form of ridges, extend generally parallel to the outer edges 35, 36 of sidewalls 26, 28 to support an end of each battery. A second set of supports 32b, in the form of discrete blocks, are provided along the connection of sidewalls 26, 28 to support the other end of each battery. In this way, the batteries are spaced from the interior faces 37, 38 of the sidewalls 26, 28 so that any leakage of acid from the batteries flows onto the faces 37, 38 without contacting or affecting the other batteries.

More specifically, the battery case can be set so that either sidewall 26 or 28 defines the lowermost base wall for supporting the battery case. The provision of supports 32 on each face 37, 38 thus produce the same isolation effect from leaked battery acid. Of course, the supports 32 could be provided on only one face if the case were to be set in only one orientation. Moreover, the supports may have any shape or construction so long as the batteries are spaced from the interior faces of the sidewalls.

Batteries 46 are further isolated from each other by partitions 33. Partitions 33 are preferably formed as flanges upstanding from each face 37, 38 to define a discrete cavity 39 for each battery. In this way, a gap can be maintained between batteries so that leakage of acid from one battery does not contact an adjacent battery and cause a short-circuit or other damage. Partitions 33 may have varying heights, widths, lengths, and shapes so long as they isolate the batteries from each other.

A joining face 40, 41 is defined along the outer edge of each of the sidewalls 26, 28 for facilitating connection with the complementary case members. The joining faces 40, 41 are spaced from interior faces 37, 38 by joining walls 42, 43. In this way, the end walls 22, 24, face 37 or 38 and joining walls 42, 43 form a basin which collects and contains any acid which may leak from one or more of the batteries and prevent seepage of the acid through the seam when the two case members 20 are joined together. More specifically, if the case is supported on sidewall 26, the joining face 40 is spaced above face 37 by joining wall 42 and adjoining face 41 is spaced above face 38 by sidewall 28 and joining wall 43. Alternatively, if case 10 is supported on sidewall 28, the joining face 41 is spaced above face 38 by joining wall 43, and joining face 40 is spaced above face 38 by sidewall 26 and joining wall 42. Accordingly the seam is above the defined basin irrespective of which sidewall 26, 28 forms the lowermost base wall for the battery case. For additional assurance against acid leaking from the case, the joining faces are preferably provided with a mating tongue 45 and groove 46. Screws 44 are then received through holes 47 to secure the case members together. Nevertheless, case members 20 may be connected by other means such as sonic welding, riveting, gluing, etc.

An electrical connector assembly 50 for the battery case, as best illustrated in FIG. 4, is secured in end wall 24 of the housing. Connector assembly 50 preferably comprises an off-the-shelf electrical connector 52, known for UPS use, which is attached to a connector plate 54 to extend through a connector hole 56. The connector plate 54 is loosely supported in a peripheral groove 57 for free motion in two dimensions (i.e., an x-y type motion). One half of the groove 57 is formed in the end plate 24 of each case member 20. Connector plate 54 further has circular guide apertures 58 to receive guide pins 60 to shift and align the electrical connector 52 with the UPS mating connector 62 as necessary. As seen in FIG. 4, the free ends 59 of guide pins 60 are tapered for guiding receipt into apertures 58. Other forms of complementary guides could also be used. The free movement of connector assembly 50 in end walls 24 enables the connector 52 to automatically connect with the connector 62 of the UPS cart. This automatic connection also allows for the battery cases to be "hot-swapped" (i.e., replaced) without shutting down UPS power.

The above described battery case 10 is especially suited for use in a UPS 64; although other uses are possible. UPS 64 typically has a front door 70 that opens to reveal bays 66 for insertion of the battery cases. Shelves 68 are provided in each bay to support the battery cases inserted therein. A completed battery case is lifted and slid end wall 24 first into bay 66 along shelf 68 until guide pins 60 engage guide apertures 58 and connector 52 is electrically coupled to connector 62.

The above discussion concerns the preferred embodiments of the present invention. Various other embodiments as well as many changes and alternatives may be made without departing from the spirit and broader aspects of the invention defined in the claims.

What is claimed is:

1. A battery case comprising a housing and a plurality of self-contained batteries enclosed within the housing, said housing including at least one lowermost base wall having a base surface in which the base wall is configured to support the battery case, at least one support extending from the base surface within said housing for supporting said batteries above the base surface, and at least one partition to define a discrete cavity for each battery so that each battery is spaced from every other battery within said housing.

2. The battery case in accordance with claim 1 further including a pair of interconnected sidewalls in which at least one of the sidewalls is selectively adapted to form the base wall.

3. The battery case in accordance with claim 2 in which said sidewalls includes the at lest one partition.

4. The battery case in accordance with claim 3 in which the housing is formed by a pair of case members that are identical to one another.

5. The battery case in accordance with claim 1, in which the housing defines an interior in which the batteries are disposed, wherein each of the batteries is disposed in a discrete battery area which is partially defined by the partition, the partition extending only partially into the interior such that the interior is primarily open and the battery areas are substantially open relative to each other.

6. The battery case in accordance with claim 5, in which the support includes a plurality of supports for supporting each of the batteries above the base surface.

7. The battery case in accordance with claim 6, in which the housing includes a pair of mating case members configured to define a generally rectangular housing.

8. A battery case comprising a housing adapted to enclose a plurality of batteries, the housing including at least a pair of sidewalls joined in an angular relationship, each of the sidewalls being adapted to selectively define a base surface which supports the battery case when at rest, the housing including a pair of end walls joining opposing ends of the pair of sidewalls; and a plurality of supports within the housing for holding each of the batteries in a spaced relationship from the base surface regardless of which sidewall forms the base surface.

9. The battery case in accordance with claim 8, in which the sidewalls include the plurality of supports.

10. The battery case in accordance with claim 9 in which the plurality of supports includes a first set of supports disposed generally parallel to an outer edge of each sidewall and a second set of supports provided along an interconnection of the pair of sidewalls.

11. The battery case in accordance with which further includes a connector electrically coupled to the batteries in which the connector is retained in a mounting portion adapted to provide parallel movement relative to at least one of the end walls.

12. The battery case in accordance with claim 11 in which the at least one of the end walls includes the mounting portion for two-dimensional movement.

13. The battery case in accordance with claim 8 which further includes a partition defining a plurality of cavities in which each cavity receives a single battery for spacing the batteries relative to each other.

14. The battery case in accordance with claim 8 in which the housing includes a pair of case members assembled together to define a generally rectangular housing.

15. The battery case in accordance with claim 8, in which the housing further includes at least one partition adapted to isolate the batteries from each other, the housing defining an interior cavity adapted to receive the batteries therein and including a discrete battery cavity for each of the batteries, the battery cavities being partially defined by the at least one partition and, the at least one partition extending only partially into the interior cavity such that the interior cavity is primarily open and the battery cavities are substantially open relative to each other.

16. A battery case comprising a housing adapted to form an enclosing cavity for a plurality of batteries, in which the housing includes a basin along a floor surface of the battery case, at least one support for supporting each of the batteries above the basin, and at least one partition defining a discrete cavity for each battery and spacing each battery from every other battery within the housing; wherein an open space is defined between the batteries and the basin for permitting a fluid to flow to the basin so as to substantially isolate the fluid within the housing from the batteries.

17. The battery case in accordance with claim 16 which further includes walls surrounding the floor surface so to define the basin to retain the fluid therein.

18. The battery case in accordance with claim 16 in which the supports engage opposing ends of the batteries.

19. The battery case in accordance with claim 16, which further includes a connector electrically coupling the batteries, and a mounting portion attaching the connector so as to provide two-dimensional movement of the connector relative to the housing.

20. The battery case in accordance with claim 16 in which the housing further includes a pair of sidewalls in which each sidewall is adapted to define the basin when the battery case is at rest such that the fluid flows to the basin.

21. The battery case in accordance with claim 20 in which the supports are included on the sidewalls.

22. The battery case in accordance with claim 16, wherein the at least one partition extends only partially into the enclosing cavity such that the enclosing cavity is primarily open and the battery cavities are substantially open relative to each other.

* * * * *

UNITED STATES PATENT AND TRADEMARK OFFICE
CERTIFICATE OF CORRECTION

PATENT NO.      : 6,599,658 B2                                      Page 1 of 1
DATED           : July 29, 2003
INVENTOR(S)     : Mark A. Vackar It is certified that error appears in the above-identified patent and that said Letters Patent is hereby corrected as shown below:

<u>Column 4,</u>
Line 67, "lest" has been replaced with -- least --.

Signed and Sealed this

Twenty-fifth Day of November, 2003

JAMES E. ROGAN
*Director of the United States Patent and Trademark Office*